United States Patent
Schnabel

(10) Patent No.: US 6,638,452 B2
(45) Date of Patent: Oct. 28, 2003

(54) METHOD FOR PRODUCTION OF STORAGE-STABLE PELLETS FROM CLARIFIED SLUDGE

(75) Inventor: Wilfried Schnabel, Köln (DE)

(73) Assignee: Baker Hughes (Deutschland) GmbH, Celle (DE)

( * ) Notice: Subject to any disclaimer, the term of this patent is extended or adjusted under 35 U.S.C. 154(b) by 46 days.

(21) Appl. No.: 09/990,560

(22) Filed: Nov. 21, 2001

(65) Prior Publication Data

US 2002/0070183 A1 Jun. 13, 2002

(30) Foreign Application Priority Data

Nov. 23, 2000 (DE) .......................................... 100 58 191

(51) Int. Cl.[7] .............................................. B29B 11/14
(52) U.S. Cl. ............................... 264/37.14; 264/37.17; 264/37.29; 264/114; 422/28; 425/404
(58) Field of Search .......................... 264/37.14, 37.17, 264/37.29, 114; 422/28; 425/404; 210/764, 768

(56) References Cited

U.S. PATENT DOCUMENTS

| 4,064,212 A | * 12/1977 | Kleeberg et al. ............. 264/117 |
| 4,374,794 A | * 2/1983 | Kok ............................. 264/122 |
| 4,398,476 A | 8/1983 | Suzuki et al. |
| 5,426,866 A | 6/1995 | Rumocki ....................... 34/321 |
| 5,428,904 A | 7/1995 | Rutz |
| 6,174,472 B1 | * 1/2001 | Johnson et al. .............. 264/118 |

FOREIGN PATENT DOCUMENTS

| DE | 31 37 227 A1 | 9/1981 |
| DE | 39 33 576 C1 | 10/1989 |
| DE | 42 35 422 A1 | 10/1992 |
| DE | 4205619 | 8/1993 |
| DE | 4315074 | 11/1994 |
| DE | 4407536 | 9/1995 |
| DE | 198 51 612 A1 | 11/1998 |
| EP | 03 96 852 A1 | 1/1990 |
| EP | 0 593 887 A1 | 9/1993 |
| EP | 1000905 | 5/2000 |

* cited by examiner

Primary Examiner—Stephen J. Lechert, Jr.
(74) Attorney, Agent, or Firm—R. Neil Sudol; Henry D. Coleman; William J. Sapone

(57) ABSTRACT

In order to produce pellets or agglomerates in an economically feasible manner from clarified sludge which contains disease-causing bacteria and which is dewatered in a solid mantle worm-gear centrifuge (11) and is subsequently thermally dried in the centrifuge housing (14), and which satisfy the conditions of being hygienically unremarkable and also storage-stable, according to the invention it is proposed that the clarified sludge pellets (25), still hot or warm due to thermal clarified sludge drying, are held at their temperature in a sanitizing apparatus (26) for a dwell time of at least 10 min and thus sanitized and additionally dried.

10 Claims, 2 Drawing Sheets

METHOD FOR PRODUCTION OF STORAGE-STABLE PELLETS FROM CLARIFIED SLUDGE

BACKGROUND OF THE INVENTION

This invention pertains to a method for production of storage-stable pellets from clarified sludge. In this method, the sludge is mechanically dewatered in a centrifuge, subsequently thermally dried with hot gas in the centrifuge housing, and shaped into pellets outside of the centrifuge. In addition, this invention pertains to a system to implement the method.

The clarified sludge occurring in large quantities in effluent clarification systems must be treated before its usage in agriculture, either by incineration, disposal in landfills which are increasingly in short supply or disposal, namely by means of mechanical, usually centrifugal, dewatering, thermal drying and shaping of the clarified sludge into agglomerates such as granulates or pellets, which promote or simplify the transport, handling and storage of the clarified sludge product.

In order to have a marketable use for the clarified sludge treated in this manner, in addition to a general absence of dust, the clarified sludge product must also be hygienically unremarkable, i.e., it must be essentially free of hazardous disease agents, and also a long-term shelf life of the product must be assured. Such a long-term shelf life, which in this case means the avoidance of biological reactions such as mold formation, can be achieved by thorough drying to a content of dry substance (TS) of over 92% with corresponding reduction in the residual moisture content. Even when utilizing the clarified sludge merely by incineration, often the end-user will demand a hygienically unremarkable product for safety reasons, in order to prevent, in absolute terms, any infection of operating personnel with potentially present disease bacteria.

Where a sanitizing of the clarified sludge cannot be definitely achieved in the treatment steps preceding the drying, such as by digestion of the sludge, then the sanitizing must take place by thermal treatment in the course of the drying, or in an additional post-treatment step.

In this regard various institutes and state agencies have projects which are aimed at obtaining a dependable sanitizing of clarified sludge by means of adherence to slightly differing time/temperature relations of the thermal treatment. For example, the requirements of the United States Environmental Protection Agency (abbreviated EPA) are internationally recognized; for pasteurization the EPA requirements call for a thermal treatment of pumpable clarified sludge of at least 30 min. at a temperature of at least 180° C., or in the case of solid materials such as dried clarified sludge, a temperature of at least 70° C. is required for a period of at least 30 min. In various known methods for thermal drying of clarified sludge, the EPA requirements are not satisfied, insufficiently met, or satisfied only at a relatively great expense for equipment. For example, in European Patent Document EP-B-0 396 852 it is disclosed how to dewater wet clarified sludge in a centrifuge, then to dry it in a contact dryer or pit dryer up to a content of dry substance TS of about 50% and then to shape the predried sludge in a device into sausage-shaped agglomerates, which are then dried to a TS-content of 90% on a belt dryer with flowing hot gas. However, due to unavoidable, irregular input of the clarified sludge onto the belt, local agglomerate piles can form which prevent a thorough drying and also a consistent heating. On the other hand, it is a known effect of this kind of irregular distribution of the clarified sludge on the belt that there are regions with greater material height and regions of lower material height, so that the hot air flow and thus the efficiency of the thermal energy is irregular when viewed across the surface of the belt. Thus, it is no longer possible to control the actual drying processes and an achieved dwell time of the clarified sludge product above the required temperature.

Also known is the combined centrifugal dewatering and thermal drying of clarified sludge in a compact structural unit in the form of a full jacket worm-gear centrifuge (German Patent Document DE-A-198 51 612), which is used as a dispersion element for a directly outlet-connected convection dryer operated with hot air or drying gas, in such a manner that the solids outlet housing, as well as the entire remaining housing of the centrifuge, is exposed to the flowing drying gas and is used as a flow dryer. Thus, the centrifugally dewatered thick material disgorged from the thick material outlet openings of the centrifuge drum is dispersed in swirling, spiral paths by the drying gas, dried to a dry substance content TS of about 70%, for example, and sent off by the drying gas outside of the centrifuge into a cyclone. Due to its residual moisture of about 30%, the clarified sludge can be shaped in a pelleting press without the use of a binder, to form relatively shape-stable sludge pellets. However, they do not satisfy the conditions stated above for being hygienically unremarkable, merely because the dwell time of the clarified sludge in the flow-drying portion of the centrifuge is very short. Of course, with this method it is also possible to achieve a clarified sludge product with a residual moisture content of less than 10%; however, the requirements stated above are not satisfied, due to the short dwell time of the clarified sludge product in the flow-dryer portion. A dwell time on the order of 30 min. and more is virtually impossible for this method. According to experience, no pellets can be produced from thoroughly dried, fine particulate, practically dust-like solid material using conventional methods, as numerous tests have shown. The addition of binders is prohibited for financial reasons, and under some circumstances will restrict the useful value of the dried clarified sludge.

Thus the situation arises that the method according to German Patent Document DE-A-198 51 612 would permit the production of a shelf-stable product, but which cannot be pressed into pellets, and pellet formation is a necessary condition for making the clarified sludge product essentially dust-free. On the other hand, the production of clarified sludge pellets is possible, but they will not have a long shelf life due to excessive residual moisture. Provided the clarified sludge has not been sanitized by a pretreatment step, such as by digestion, then the clarified sludge product can by no means be viewed as hygienically satisfactory.

SUMMARY OF THE INVENTION

The present invention is based on the problem of producing pellets or agglomerates in an economically feasible manner from clarified sludge which is dewatered in a full jacket worm-gear centrifuge and is subsequently thermally dried in the centrifuge housing, and which satisfies the conditions of being hygienically unremarkable and also storage-stable.

In a method according to the present invention, the pellets or agglomerates which are coming from the pelleting device outlet-connected to the centrifuge dryer, are not cooled down, but rather they are held quite the contrary, at their temperature of at least about 50° C. in an enclosed sanitizing apparatus at the outlet from the pelleting device, by usage of the residual pellet heat for a long time of at least about 10 min, so that the clarified sludge pellets exiting from the sanitizing apparatus after passage of this dwell time, have become hygienically unremarkable. If the hot or warm pellets come from the pelleting press at a temperature of about 80° C., for example, then the pellets need be heated very little or not at all, during their dwell time in the sanitizing apparatus.

At the same time, by keeping the clarified sludge pellets at the temperature level stated above, additional post-drying of the clarified sludge pellets will occur, so that the pellets will become harder and thus more stable in storage. Thus, the danger of mold formation on the clarified sludge pellets treated according to this invention will be reduced to zero, because the residual moisture of these pellets also goes to zero.

Only when the minimum temperature of the clarified sludge pellets in the sanitizing apparatus cannot be maintained for the entire dwell time is the use of additional energy required, e.g., the use of a hot gas stream in the sanitizing apparatus.

According to one special property of the invention, the clarified sludge pellets still hot or warm due to the thermal clarified sludge drying, are held in the sanitizing apparatus at a temperature of at least 70° C. for a dwell time of at least 30 min. If the sanitizing apparatus has a hot gas flowing through it, then the additional advantages are attained that due to a suitable selection of volume flow and temperature of the hot gas, an excessively fast drying and break-up of the pellets will be avoided, and at the same time the fines of the pellets to be sanitized can be removed with the hot gas stream from the sanitizing apparatus.

If hot gas is needed in the sanitizing apparatus, then exhaust gas should be used which is provided by the drying itself, according to the method of German Patent Document DE-A-198 51 612, that is, an otherwise nonutilized exhaust gas which typically leaves the drying system at a temperature of about 120 to about 210° C. After passing through the sanitizing apparatus, this exhaust gas moves into the (otherwise required) exhaust gas scrubbing system of the drying process. The sanitizing proposed by the invention and the attainment of a shelf life for the pellets of dried clarified sludge according to this invention is an integral constituent of the clarified sludge drying, so that no additional energy is needed and no additional exhaust gas is created, which under some circumstances would require additional post-treatment.

BRIEF DESCRIPTION OF THE DRAWINGS

The invention and its additional properties and advantages will be explained in greater detail based on the schematic design examples presented in the drawing figures.

DETAILED DESCRIPTION OF THE PREFERRED EMBODIMENTS

Figure 1:
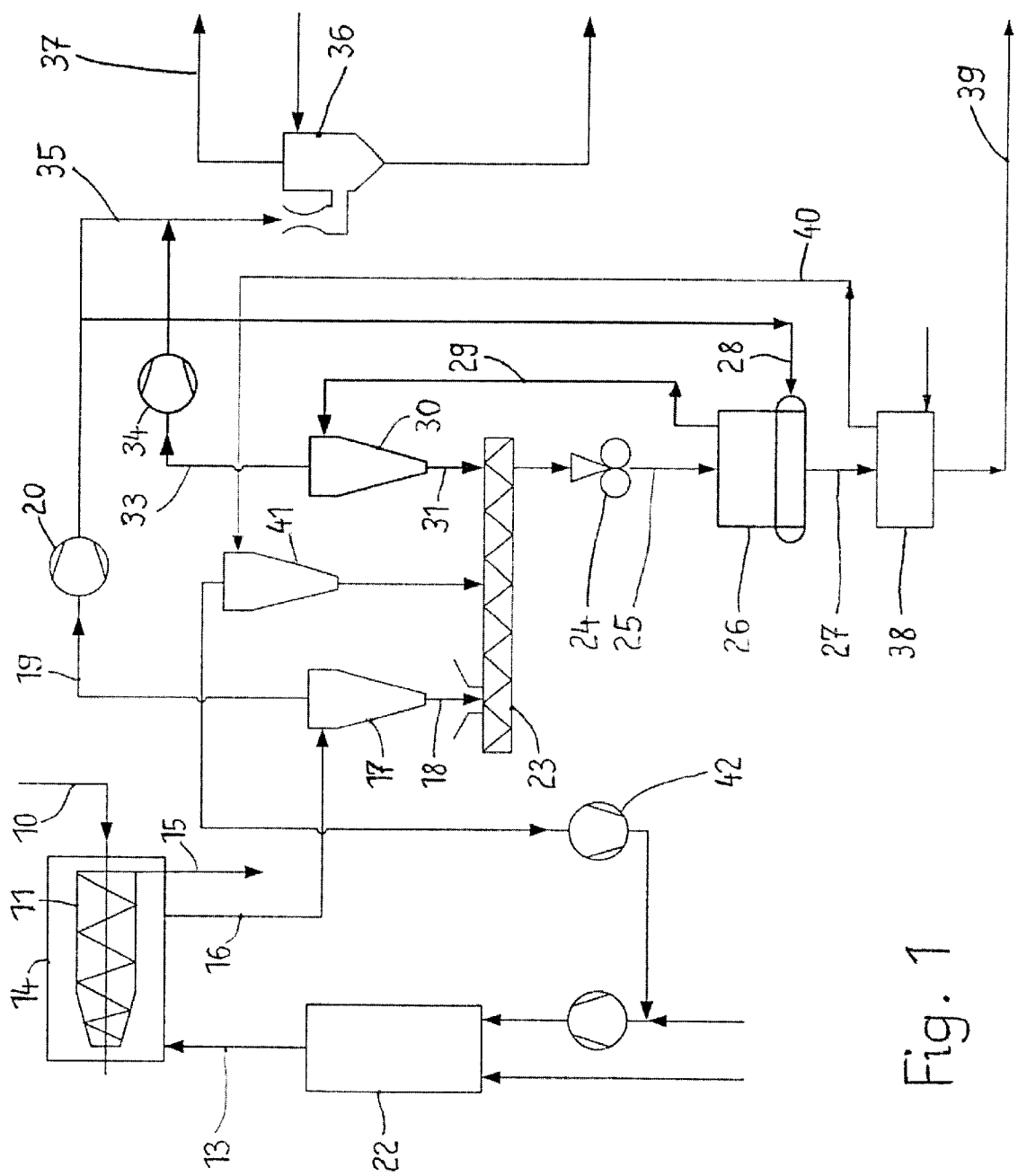
FIG. 1 is a schematic flow chart of the production of storage-stable pellets, safe from the standpoint of infectious disease, from clarified sludge by use of hot gas from the drying process.

According to FIG. 1, wet clarified sludge 10 is dewatered in a full jacket worm-gear centrifuge 11 to a dry substance content TS of about 35%, for example. The solid material accelerated out from the rotating centrifuge drum 11 at the solids outlet end (left end) is picked up in dispersed form by a drying gas stream 13 and is swirled up and dried in the annulus between drum 11 and centrifuge housing 14, i.e., the centrifuge housing is at the same time the housing of a flow dryer. The centrifuged product separated from the solids, as shown schematically, is withdrawn at 15. The drying gas 13 suspending the solids leaves the machine at 16 and pneumatically conveys the solid material, which has been convectively dried to a TS content of about 80% in the design example, to a cyclone separator 17, through which the solids 18 are expelled from the drying gas 19, which is pulled by the suction fan 20 at a temperature of about 120 to 210° C., for example. A portion of the drying gas 19 can be recirculated to the hot gas generator 22 which produces the drying gas 13.

The convectively dried solids 18 are sent without intermediate storage, through a conveyor element 23 to a pelleting device 24, e.g., a pelleting press, which creates clarified sludge pellets 25 from the solid material, e.g., in the shape of little sausages that are about 5 to 25 mm long, for example, and about 2 to 10 mm thick. These relatively stable clarified sludge pellets 25 with their residual moisture of about 20% can have a temperature throughout of about 80° C., i.e., the pellets 25 are still hot or very warm. The heat stored in the pellets is utilized according to this invention in that the clarified sludge pellets 25 are introduced into a sealed sanitizing apparatus 26 and are kept there for a time of about 30 min at a temperature of about 70° C. or more, so that after this dwell time, clarified sludge pellets 27 exiting from the sanitizing apparatus 26 have become hygienically unremarkable. At the same time, the clarified sludge pellets in the sanitizing apparatus 26 have been post-dried. In any case, the clarified sludge pellets 27 produced according to this invention are storage-stable both from the viewpoint of hygiene and strength.

It is an advantage to pass a hot gas 28 through the sanitizing apparatus 26, so that the required sanitizing temperature of the pellets can be precisely maintained, and so that as exhaust stream 29, the material which has been produced by abrasion of the clarified sludge pellets being sanitized will be transported to a cyclone separator 30, from where the material 31 is recirculated to the input material of the pelleting device 24.

The enclosed sanitizing apparatus 26 can be designed as a kind of carousel dryer, in which the pellets are placed onto a disk composed of screen-like segments and rotating about a vertical axis, and after a certain number of rotations are ejected in sequence onto equivalent rotary disks located underneath, until the pellets arrive sanitized on the bottom rotary disk. It would also be possible to use a belt dryer as sanitizing apparatus, in which a perforated belt filled with the pellets is moved on a meandering course through an enclosed housing. But in any case, as sanitizing apparatus only those sealed apparatus in which the dwell time of the entire volume of product is determined by mechanical or other features can be considered. Shaking apparatus or silo-like apparatus would not be suitable, since a faster passage of certain product segments cannot be prevented in comparison to the calculated, average transit speed, and thus it will not be assured that all pellets are exposed sufficiently long to the required temperature level.

Figure 2:
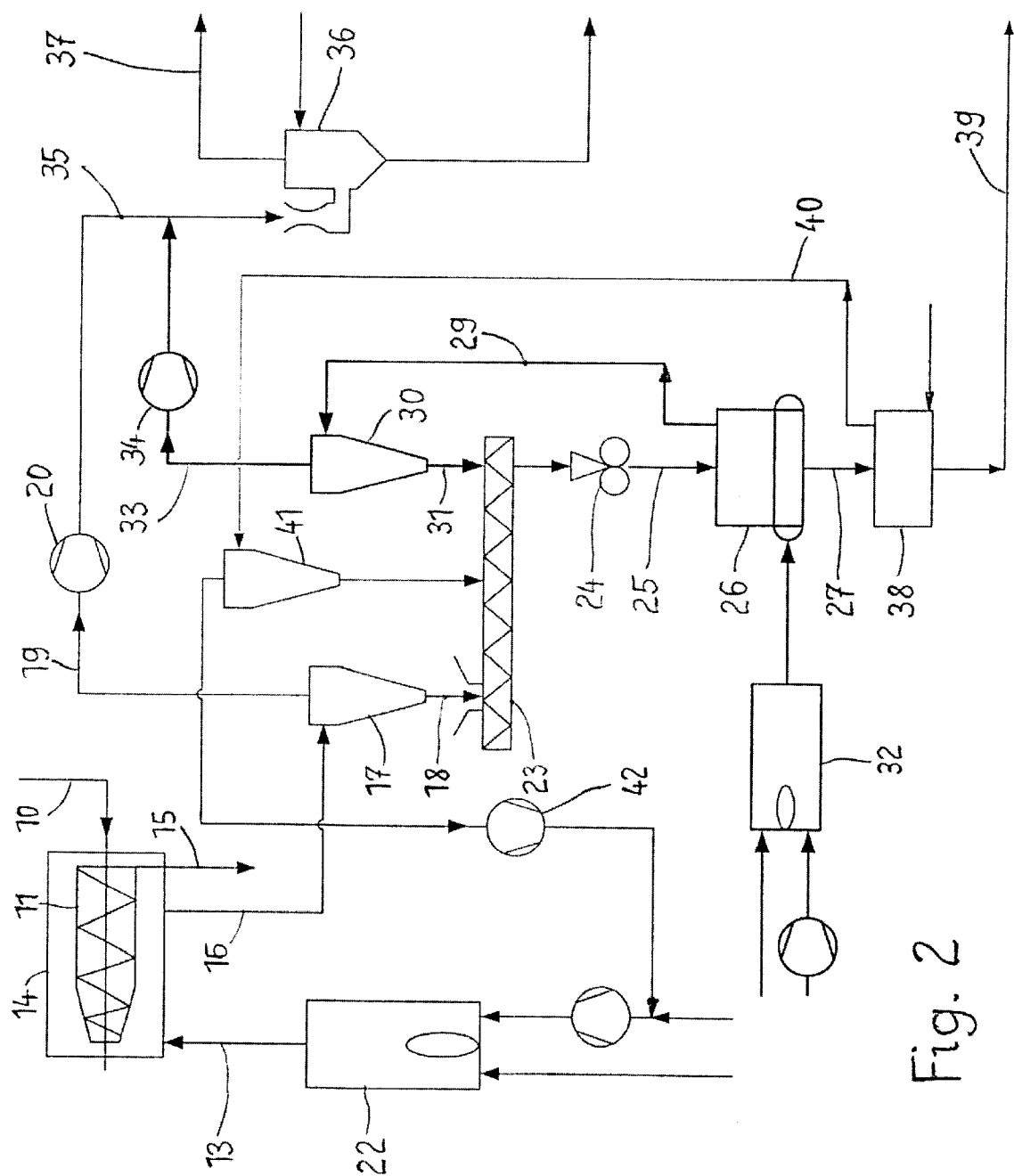
FIG. 2 shows the flow chart of FIG. 1, with a variant of separate hot gas supply to the sanitizing apparatus.

Whereas according to FIG. 1, the hot gas 28 flowing through the sanitizing apparatus 26 has branched off from the exhaust 19 of the clarified sludge drying, in the variant in FIG. 2, the sanitizing apparatus 26 is supplied with hot gas from a separate hot gas generator 32. Both in FIG. 1 and also in FIG. 2, the vapor-laden exhaust 33 from the sanitizing apparatus 26, which is pulled off by the suction fan 34, is cleaned together with the vapor-laden exhaust 35 from the clarified sludge drying in a gas scrubber 36 with vapor condensation. Reference number 37 denotes the purified exhaust. Now, provided the hot gas stream 28 used in the sanitizing apparatus 26 according to FIG. 1 is taken from the exhaust 19 from the clarified sludge drying, then the total quantity of exhaust to be treated will increase little or not at all.

The sanitized, warm pellets 27 according to this invention are cooled in a cooler 38 utilizing cool air, so that the strength of the clarified sludge pellets composing the product 39 will be increased. Cooling of the pellets will also cause a reduction in post-evaporation of residual moisture still present in the pellets, so that the transport and storage stability of the clarified sludge pellets produced according to this invention will be further enhanced. The exhaust air 40 from the cooler 38 will be dust-filtered in a cyclone 41 with the solids output recirculated to the pelleting device 24, while the air is moved by the fan 42 into the hot gas generator 22, and used there as preheated combustion air.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are proffered by way of example to facilitate comprehension of the invention and should not be construed to limit the scope thereof.

What is claimed is:

1. A method for production of storage-stable pellets from clarified sludge, which is mechanically dewatered in a centrifuge, subsequently thermally dried with hot gas in a housing of the centrifuge and shaped into pellets outside of the centrifuge, wherein the clarified sludge pellets, still hot or warm due to the thermal clarified sludge drying, are held at their temperature in a sanitizing apparatus for a dwell time of at least 10 minutes and thus sanitized and additionally dried.

2. The method according to claim 1 wherein the clarified sludge pellets, still warm due to the thermal clarified sludge drying, are held at a temperature of at least 50° C. during their dwell time in the sanitizing apparatus.

3. The method according to claim 2 wherein the clarified sludge pellets still warm due to the thermal clarified sludge drying, are held in the sanitizing apparatus at a temperature of at least 70° C. for a dwell time of at least 30 min.

4. The method according to claim 3 wherein the sanitizing apparatus, to set or maintain the required temperature of the clarified sludge pellets, is provided with a flowing hot gas which is obtained from a source taken from the group consisting of (a) an exhaust of the clarified sludge drying and (b) a separate hot gas generator.

5. The method according to claim 4, further comprising transporting, from an exhaust of the sanitizing apparatus, material which is produced due to abrasion of the clarified sludge pellets being sanitized, to a cyclone separator, and recirculating such material from the cyclone separator to an inlet of a pelleting device.

6. The method according to claim 1, further comprising cleaning, in a gas scrubber, vapor-laden exhaust from the sanitizing apparatus jointly with vapor-laden exhaust from the clarified sludge drying.

7. The method according to one or more of claim 1 wherein a carousel dryer or a belt dryer is used as the sanitizing apparatus.

8. Method according to claim 1 wherein the sanitized, warm pellets are cooled in a cooler.

9. The method according to claim 1 wherein the sanitizing apparatus, to set or maintain the required temperature of the clarified sludge pellets, is provided with a flowing hot gas which is obtained from a source taken from the group consisting of (a) an exhaust of the clarified sludge drying and (b) a separate hot gas generator.

10. The method according to claim 9, further comprising transporting, from an exhaust of the sanitizing apparatus, material which is produced due to abrasion of the clarified sludge pellets being sanitized, to a cyclone separator, and recirculating such material from the cyclone separator to an inlet of a pelleting device.

* * * * *